(12) United States Patent
Kawabata et al.

(10) Patent No.: US 6,520,879 B2
(45) Date of Patent: Feb. 18, 2003

(54) POWER TRANSMISSION APPARATUS AND FOUR WHEEL DRIVE EQUIPPED WITH THE SAME

(75) Inventors: Yasutomo Kawabata, Aichi-ken (JP); Shigeru Matsuhashi, Toyota (JP); Nobuyoshi Takagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 09/789,745

(22) Filed: Feb. 22, 2001

(65) Prior Publication Data

US 2002/0115516 A1 Aug. 22, 2002

(51) Int. Cl.$^7$ ................................................. F16H 3/72
(52) U.S. Cl. ........................... 475/5; 180/65.4; 180/65.2
(58) Field of Search ...................... 477/2, 3; 180/65.2, 180/65.3, 65.4; 475/5

(56) References Cited

U.S. PATENT DOCUMENTS

| 5,492,189 A | * | 2/1996 | Kriegler et al. ............. 180/65.2 |
| 5,898,282 A | * | 4/1999 | Drozdz et al. .............. 180/65.4 |
| 5,998,901 A | | 12/1999 | Kawabata et al. |
| 6,005,297 A | | 12/1999 | Sasaki et al. |
| 6,026,921 A | * | 2/2000 | Aoyama et al. ............. 123/348 |
| 6,048,289 A | * | 4/2000 | Hattori et al. ............. 180/65.2 |
| 6,251,042 B1 | * | 6/2001 | Peterson et al. ................ 477/3 |
| 6,328,670 B1 | * | 12/2001 | Minowa et al. ............ 180/65.2 |
| 6,371,878 B1 | * | 4/2002 | Bowen ....................... 180/65.7 |
| 6,387,007 B1 | * | 5/2002 | Fini, Jr. ..................... 180/65.4 |
| 2001/0011050 A1 | * | 8/2001 | Yamaguchi et al. ........... 477/3 |
| 2001/0024996 A1 | * | 9/2001 | Sugano .......................... 477/2 |
| 2001/0042647 A1 | * | 11/2001 | Sakamoto et al. ......... 180/65.2 |
| 2002/0007974 A1 | * | 1/2002 | Nagano et al. ............ 180/65.2 |
| 2002/0061802 A1 | * | 5/2002 | Chung ........................... 477/3 |
| 2002/0065165 A1 | * | 5/2002 | Lasson et al. ................. 477/3 |

FOREIGN PATENT DOCUMENTS

JP 11-270376 * 10/1999 ........... F02D/29/02

* cited by examiner

Primary Examiner—Rodney H. Bonck
Assistant Examiner—David D. Le
(74) Attorney, Agent, or Firm—Oliff & Berridge, PLC

(57) ABSTRACT

A power outputting apparatus is provided with an engine, a clutch motor connected to a crank shaft thereof, and an assist motor connected to the crank shaft or a drive shaft by a switch apparatus. At a time of moving a vehicle backward, an operation characteristic of the engine is set to a characteristic on a low torque side in place of a characteristic at a time of moving forward (a characteristic giving priority to an efficiency). In addition, a torque Tm larger than an engine torque Te and in a reverse direction is output from the assist motor. As a result, a high torque is output to the drive shaft while an electric power is regenerated by the clutch motor, whereby the vehicle can be backward moved.

20 Claims, 9 Drawing Sheets

POWER TRANSMISSION APPARATUS AND FOUR WHEEL DRIVE EQUIPPED WITH THE SAME

BACKGROUND OF THE INVENTION

1. Field of the Invention

The invention relates to a power transmission apparatus, a power outputting method and a hybrid vehicle, and more particularly to a power transmission apparatus and a power outputting method which can output at least a part of power output by a prime mover to a drive shaft in a mechanical form, and a hybrid vehicle equipped with a prime mover which can output at least a part of power to a drive shaft in a mechanical form and a power adjusting apparatus which can transmit the power between the drive shaft.

2. Description of the Related Art

As an apparatus for converting an output torque of a prime mover such as an internal combustion engine so as to transmit power, in recent years, there is suggested a structure obtained by combining an electric motor with a power distribution performed by a planetary gear mechanism, and a structure for distributing power by employing a pair-rotor electric motor having two relatively rotatable rotors so as to utilize a slip between the rotors, in place of a torque converter using fluid. As a structure which employs the power transmission apparatus for transmitting the power to a plurality of drive shafts, for example, there is known a structure shown in Japanese Patent Laid-Open Publication No. HEI9-175203. The power transmission apparatus mentioned above is excellent in view that an advantage of a high efficiency can be obtained since the power is not transmitted to fluid or the like.

However, in such a power transmission apparatus, there has been a problem that there were some cases where a sufficient torque can not be obtained when reversely rotating the drive shaft. This is due to the following reasons. In the case of the power transmission apparatus which can output at least a part of the power output by the prime mover to the drive shaft in a mechanical form, it is generally impossible to reversely rotate the prime mover such as an engine, even in the case of reversely rotating the drive shaft. Accordingly, there is performed a control of reversely rotating the drive shaft while normally rotating the engine. In the case where the power transmission apparatus is provided with a battery and is sufficient to use an electric power stored in the battery, it is sufficient to stop the engine and reversely rotate the drive shaft only by a torque of the electric motor. However, in the case where it is impossible to respond to the situation only by the electric power stored in the battery and the case where a state of charge of the battery is low, it is necessary to generate a reverse rotation torque in the electric motor while generating electric power using the power of the engine so as to reversely rotate the drive shaft. In such cases, the torque output to the drive shaft becomes a torque obtained by subtracting an output torque in a normal rotating direction generated by the engine from a torque in a reverse rotating direction generated by the electric motor connected to the drive shaft.

The problem mentioned above can not be overlooked in a so-called hybrid vehicle in which the power transmission apparatus in accordance with the above aspect is mounted, since a high torque can not be obtained particularly at a time when the vehicle moves backward. In the power transmission apparatus outputting at least a part of the power output by the prime mover to the drive shaft in accordance with a mechanical form, the same problem occurs both in an electricity distribution type in which power is distributed using an electric motor having a pair of relatively rotating rotors or in a mechanical distribution type employing a three-shaft type power distributor such as a planetary gear or the like. Here, if a planetary gear is employed for distributing the power in the latter case, since the number of revolutions and the torque of each of the shafts have a simple proportional relation determined by the number of teeth, there is a problem that when the drive shaft is reversely rotated and the number of revolutions and the torque of the prime mover are high, the number of revolutions and the toque of another shaft are out of allowable ranges. Accordingly, the number of revolutions of the drive shaft was limited in this respect as well.

SUMMARY OF THE INVENTION

An object of the invention is to provide a power transmission apparatus, a power outputting method and a hybrid vehicle equipped with the power transmission apparatus which can solve the problems mentioned above and increase freedom in controlling a number of revolutions of a drive shaft and a torque in the case of reversely rotating the drive shaft.

In order to solve at least a part of the object mentioned above, in accordance with the invention, there is provided a power transmission apparatus which can output at least a part of power output by a prime mover to a drive shaft in a mechanical form, comprising:

a prime mover adjuster adjusting a state of the power output from the prime mover;

a power generator connected to the prime mover in such a manner as to be capable of electrically regenerating at least a part of the power output from the prime mover;

an electric motor connected between an output shaft of the prime mover and the drive shaft and capable of normally rotating so as to rotate the drive shaft in the same direction as a rotation direction of the output shaft and reversely rotating so as to rotate the drive shaft in a reverse direction to the rotation direction of the output shaft; and a controller rotatively driving the electric motor in the reverse direction to that of the output shaft of the prime mover by using an energy regenerated by the power generator and controlling the prime mover adjuster so as to control a state of the power output from the prime mover to an amount lower than that in the case of normally rotating the drive shaft, at a time of reversely rotating the drive shaft.

Further, in accordance with the invention, in correspondence to the power transmission apparatus mentioned above, there is provided a power outputting method which outputs at least a part of power output by a prime mover to a drive shaft in a mechanical form, comprising the steps of:

adjusting a state of the power output from the prime mover;

electrically regenerating at least a part of the power output from the prime mover by a power generator connected to an output shaft of the prime mover, and normally rotating the drive shaft in the same direction as a rotation direction of the output shaft by an electric motor connected between the output shaft of the prime mover and the drive shaft or reversely rotating the drive shaft in a reverse direction to the rotation direction of the output shaft; and at a time of rotating the drive shaft in a reverse direction, rotating the electric motor in the reverse direction to that of the output shaft of the prime mover by using an energy regenerated by the power generator and controlling a state of the power output from the prime mover to an amount lower than that in the case of normally rotating the drive shaft.

In accordance with the power transmission apparatus and the power outputting method mentioned above, at a time of rotating the drive shaft in the reverse direction, the electric motor is rotated in the reverse direction to that of the output shaft of the prime mover by using the energy regenerated by the power generator, and the state of the power output from the prime mover is controlled to an amount lower than that in the case of rotating the drive shaft in the normal direction. Accordingly, it is possible to increase the power in the reverse direction output from the drive shaft.

Further, in the power transmission apparatus or the like mentioned above, the structure may be made such that the power generator is a pair-rotor electric motor equipped with two relatively rotatable rotors, wherein one of the pair of rotors is connected to the output shaft of the prime mover and another of a pair of rotors is connected to the drive shaft. In the case where the pair-rotor electric motor is employed for the power generator, in power distribution, power is taken out as an electrical energy in accordance with a slip number of revolutions corresponding to a relative number of revolutions of a pair of rotors, and the remaining energy is output to the drive shaft in a mechanical form, so that the apparatus can be made compact.

In this case, when the electric motor mentioned above can be selectively connected to one of the output shaft of the prime mover and the drive shaft and the drive shaft is reversely rotated, the electric motor may be connected to the drive shaft. In this case, it is possible to connect the electric motor to the output shaft of the prime mover so as to realize a so-called overdrive state and it is possible to connect the electric motor to the drive shaft so as to realize a so-called under-drive state. Since there is provided the structure for switching the shaft for connecting the electric motor, no recirculation of the energy is generated in either cases. In the case of reversely rotating the drive shaft, since the drive shaft can not be reversely rotated at a number of revolutions above the number of revolutions (including the rotation direction) of the prime mover, the structure may be made such that the electric motor is connected to the drive shaft, in this case.

Further, as the prime mover mentioned above, it is possible to employ an internal combustion engine which performs an explosive combustion by mixing an air sucked via an intake valve with a fuel. As the fuel, it is possible to use various kinds of fuels such as gasoline, light oil, alcohol, propane gas, and natural gas. Of course, it is possible to utilize other prime movers such as a gas turbine. In the case of using the internal combustion engine as the prime mover, the structure may be made such that means for controlling an amount of intake air and an opening and closing timing of the intake valve is provided as means for adjusting a state of power of the prime mover.

The structure may be made such that the power transmission apparatus is provided with a battery storing an electric power regenerated by the power generator so as to drive the electric motor using at least a part of the electric power stored in the battery in addition to the regenerated electric power at a time when the controller reversely rotates the drive shaft. Since the electric power in the battery is used in addition to the regenerated electric power, it is possible to output a high power to the drive shaft within an allowable range of a residual capacity of the battery.

As another structure for distributing the power from the prime mover, there is a so-called mechanical distribution aspect. This structure is provided with three shafts, and employs a three-shaft type power transmission mechanism in which the power input to and output from the one shaft is determined by the power input to and output from other two shafts, wherein one of three shafts in this mechanism is connected to the output shaft of the prime mover, another one shaft is connected to the drive shaft, and the remaining one shaft is connected to the power generator. Further, the electric motor is connected to the drive shaft. By making the structure in the above manner, it is possible to output at least a part of the power output from the prime mover to the drive shaft in a mechanical form. When employing the structure of the mechanical distribution type, it is not necessary to employ the pair-rotor electric motor and it is possible to simplify the structure.

In accordance with the invention, there is provided a hybrid vehicle equipped with a prime mover which can output at least a part of power to a drive shaft in a mechanical form and a power adjusting apparatus which can transmit the power between the drive shaft, comprising:

a prime mover adjuster adjusting a state of the power output from the prime mover, wherein the power adjusting apparatus comprises:

a power generator capable of electrically regenerating at least a part of the power output from the prime mover;

an electric motor connected between an output shaft of the prime mover and the drive shaft and capable of normally rotating so as to rotate the drive shaft in the same direction as a rotation direction of the output shaft and reversely rotating so as to rotate the drive shaft in a reverse direction to the rotation direction of the output shaft; and a controller rotatively driving the electric motor in the reverse direction to that of the output shaft of the prime mover by using an energy regenerated by the power generator and controlling the prime mover adjuster so as to control a state of the power output from the prime mover to an amount lower than that in the case of normally rotating the drive shaft, at a time when the vehicle moves backward.

In this hybrid vehicle, when the vehicle moves backward, the prime mover adjuster is controlled so as to control the state of the power output from the prime mover to be lower than that in the case of normally rotating the drive shaft. Accordingly, in the case of reversely rotating the drive shaft, the drive torque of the drive shaft which is taken out as the difference between the torque of the electric motor and the torque of the prime mover can be made large as compared to the state in which the prime mover is not controlled. As a result, it is possible to make the state of the power at a time of backward movement close to the desired power.

The invention can be applied to a four wheel drive hybrid vehicle. Further, in addition to vehicles, the invention can be employed for ships, machining tools or other equipment.

DETAILED DESCRIPTION OF THE PREFERRED EMBODIMENTS

A description will be given below of embodiments in accordance with the invention.

Figure 1:
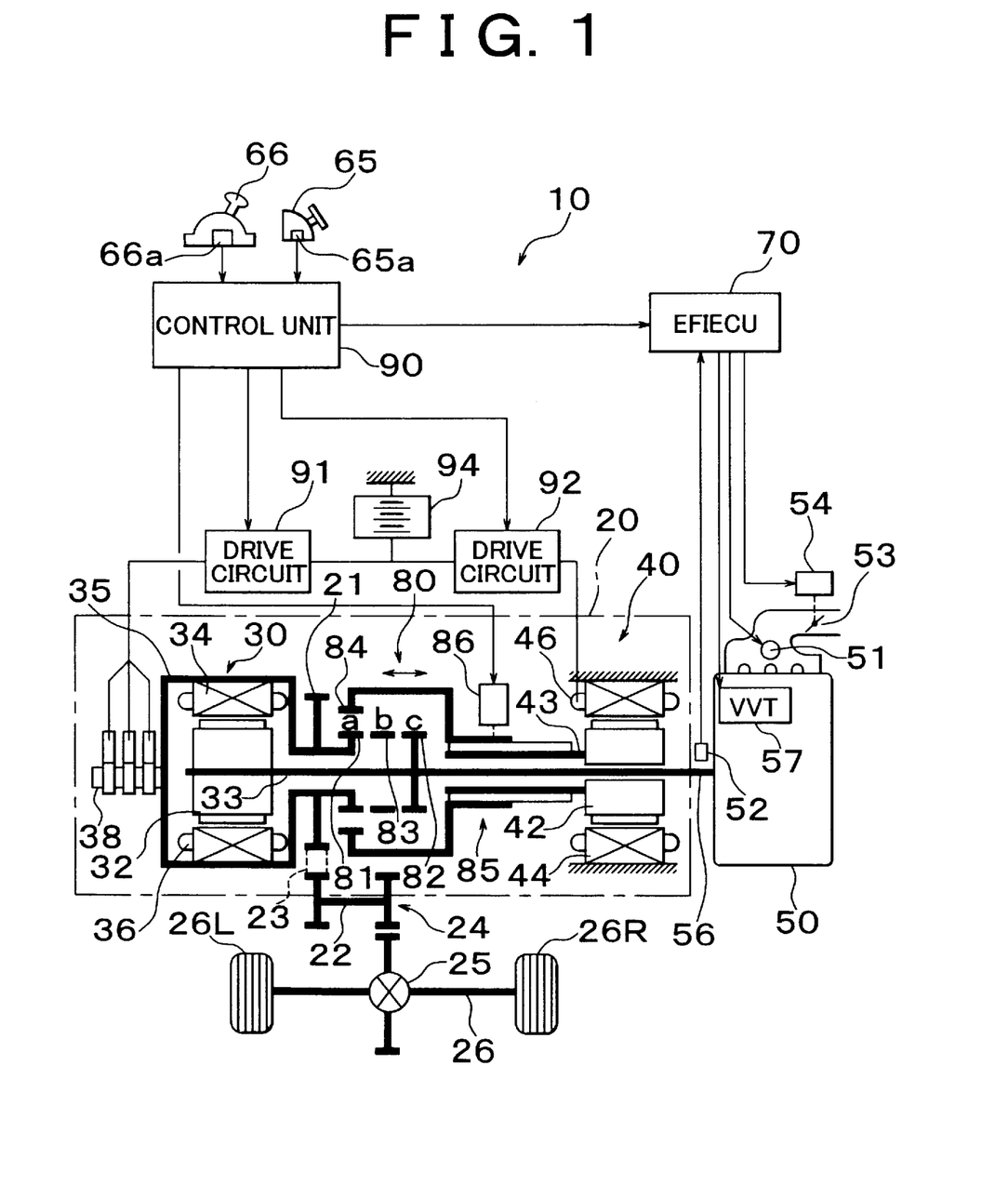
FIG. 1 is an explanatory view showing an entire structure of a hybrid vehicle corresponding to a first embodiment of the invention.

At first, a description will be given of a structure of the embodiment with reference to FIG. 1. FIG. 1 is an explanatory view showing a schematic structure of a hybrid vehicle on which a power transmission apparatus in accordance with the present embodiment is mounted. A power system in the hybrid vehicle is constituted by the following structure. An engine 50 corresponding to a prime mover provided in the power system is an ordinary gasoline engine, and rotates a crank shaft 56. An operation of the engine 50 is controlled by an exclusive fuel injection control unit (hereinafter, referred to as an EFIECU) 70. The EFIECU 70 is a one-chip microcomputer having CPU, ROM, RAM and the like therein, and the CPU mainly executes a fuel injection volume control of the engine 50, an advance angle control of an intake and exhaust valve and other controls in accordance with a program stored in the ROM. In order to make it possible to execute these controls, a fuel injection valve 51, a throttle valve motor 54 controlling an opening degree of a throttle valve 53 or a VVT 57 controlling an opening and closing timing of an intake and exhaust valve (not shown) and the like are provided in the EFIECU 70. Further, sensors required for executing the controls, that is, various kinds of sensors indicating an operation state of the engine 50 are connected thereto. One of them is a revolutions sensor 52 detecting a number of revolutions of the crank shaft 56. An illustration of other sensors such as a water temperature sensor detecting a cooling water temperature Tw, switches, and the like is omitted.

A power transmission apparatus 20 is arranged between the crank shaft 56 of the engine 50 and a drive shaft 22 outputting power for driving wheels 26. The power transmission apparatus 20 is an apparatus basically transmitting power of the engine 50 to the drive shaft 22, and is mainly constituted by a clutch motor 30, an assist motor 40 and a switch apparatus 80 switching a shaft to which the assist motor 40 is connected.

The clutch motor 30 is basically constituted by a synchronous electric motor using a permanent magnet, however, is different from an ordinary motor in that a member around which a three-phase coil generating a magnetic field is wound is structured as a rotatable rotor and not as a so-called stator fixed to a case. That is, in the clutch motor 30, not only an inner rotor 32 corresponding to the rotor in an ordinary motor, but also an outer rotor 34 around which a three-phase coil 36 is wound can freely rotate. The motor mentioned above is called a pair-rotor electric motor. In this type of electric motor, since the outer rotor 34 in which the three-phase coil 36 is provided is also rotated, it is necessary to provide a mechanism for supplying an electric power to the rotating coil 36. In the present embodiment, a slip ring 38 is provided so as to supply an electric power to the three-phase coil 36, however, it is possible to use the other structures such as a differential transformer. In the clutch motor 30, the inner rotor 32 and the outer rotor 34 rotate relatively to each other due to a mutual operation between a magnetic field generated by a permanent magnet provided in the inner rotor 32 and a magnetic field generated by a three-phase coil 36 provided in the outer rotor 34. In this case, since the operation mentioned above is reversible, it is possible to operate the clutch motor 30 as a power generator and to regenerate an electric power corresponding to the difference of the number of revolutions between both rotors from the clutch motor 30.

An inner rotor shaft 33 is connected to the inner rotor 32 of the clutch motor 30, and an outer rotor shaft 35 is connected to the outer rotor 34. The inner rotor shaft 33 is connected to a crank shaft 56 via a damper (not shown). The outer rotor shaft 35 is connected to the drive shaft 22 via an output gear 21 and a chain 23. The drive shaft 22 is further connected to an axle 26 provided with drive wheels 26R and 26L via a speed reduction gear 24 and a differential gear 25. Accordingly, the number of revolutions and the torque of the outer rotor 35 in the clutch motor 30 and the number of revolutions and the torque of the axle 26 have a direct corresponding relation.

Since the clutch motor 30 is structured such that both the inner rotor 32 and the outer rotor 34 can be rotated, it is possible to transmit power input from one of the inner rotor shaft 33 and the outer rotor shaft 35 to the other. Although it is impossible to change the torque by the clutch motor 30 itself due to an action and reaction relation, however, if a power running is performed by setting the clutch motor 30 as an electric motor, the number of revolutions of the other shaft becomes high. Accordingly, power (=number of revolutions×torque) output from the other shaft becomes high. When a regenerating operation is performed by setting the clutch motor 30 as the power generator, the number of revolutions of the other shaft becomes low, and it is possible to take out an electric power corresponding to the difference between the number of revolutions (=difference of number of revolutions×torque). That is, by using the clutch motor 30, it is possible to transmit the remaining power while taking out a part of the power in a form of electric power. Further, if neither the power running nor the regenerating operation is performed, a state is created in which the power is not transmitted. Since this state corresponds to a state in which the mechanical clutch is released, this electric power generator is called as a clutch motor.

The assist motor 40 corresponding to another motor constituting the power transmission apparatus 20 is also structured as a synchronous electric motor using a permanent magnet, and in the present embodiment, the permanent magnet and the three-phase coil 46 are respectively provided in a side of a rotor 42 and a side of a stator 44. The stator 44 of the assist motor 40 is fixed to a case, and the rotor 42 is connected to a hollow rotor shaft 43. The inner rotor shaft 33 connected to a crank shaft 56 extends through an axial center of the hollow rotor shaft 43.

In order to drive the clutch motor 30 and the assist motor 40, a first drive circuit 91 and a second drive circuit 92 which are connected to a battery 94 are provided. The first drive circuit 91 is a transistor inverter provided with a plurality of transistors corresponding to switching elements therein, and is electrically connected to a control unit 90. When the control unit 90 PWM controls an on and off time of the transistor in the first drive circuit 91, a three-phase alternating current flows through a portion between the battery 94 and the three-phase coil 36 wound around the outer rotor 34 of the clutch motor 30 via the first drive circuit 91 and the slip ring 38 connected to both elements. A rotational magnetic field is formed in the outer rotor 34 in accordance with the three-phase alternating current, and the rotation of the clutch motor 30 is controlled. As a result, it is possible to perform an operation of power running the clutch motor 30 by using an electric power of the battery 94, an operation of storing the electric power regenerated from the clutch motor 30 in the battery 94, and the like.

On the contrary, the assist motor 40 is connected to the battery 94 via the second drive circuit 92. The second drive circuit 92 is also constituted by a transistor inverter, and is connected to the control unit 90 so as to be operated in accordance with the control thereof. When switching the transistor in the drive circuit 92 in accordance with the control signal of the control unit 90, the three-phase alternating current flows through the three-phase coil 46 wound around the stator 44 and generates the rotational magnetic field, whereby the assist motor 40 is rotated. The assist motor 40 can also perform a regenerating operation.

In addition to the clutch motor 30 and the assist motor 40 mentioned above in detail, a switch apparatus 80 is provided in the power transmission apparatus 20. This switch apparatus 80 connects the assist motor 40 to any one of the outer rotor shaft 35 and the inner rotor shaft 33 in the clutch motor 30, or switches to a state in which the assist motor 40 is not connected to any of the shafts. A description will be given of a structure of the switch apparatus 80. The switch apparatus 80 is provided with a first gear 81 connected to the outer rotor shaft 35 in the clutch motor 30, a second gear 82 connected to the inner rotor shaft 33, a third gear 83 connected to neither one of the shafts, and a movable gear 84 engaged with these gears. The movable gear 84 is connected to another member of a spline shaft 85 having one end fixed to the rotor shaft 43. Accordingly, the movable gear 84 can slide in an axial direction with respect to the rotor shaft 43 while rotating together with the rotor shaft 43. An actuator 86 for switching a sliding position of a movable gear 84 in the spline shaft 85 is provided in the switch apparatus 80. The actuator 86 can be realized by a motor, a solenoid or the like, and is controlled by a control unit 90.

Figure 2:
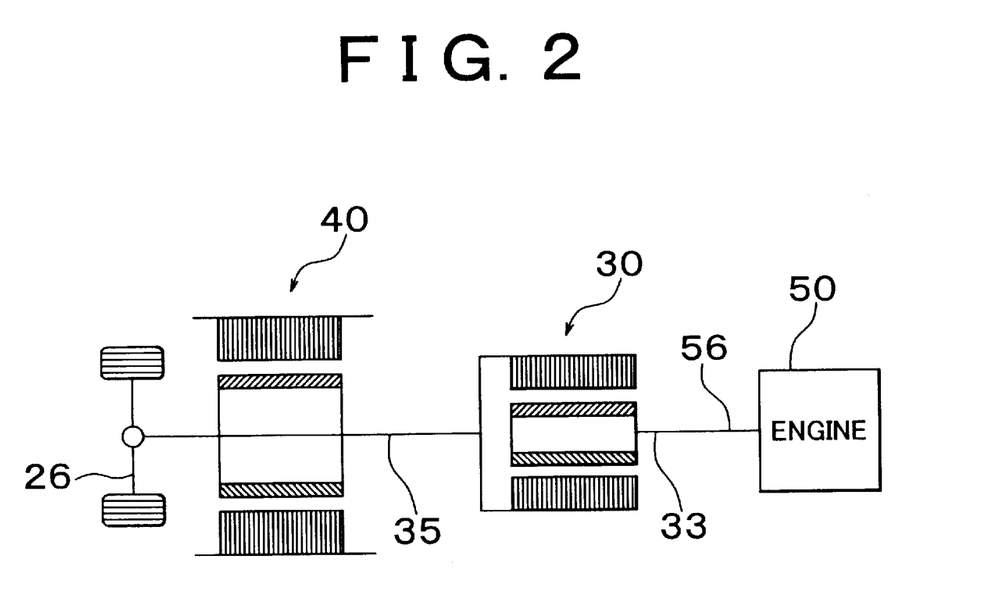
FIG. 2 is an explanatory view showing a schematic structure of a power system at a time of under-drive connection, with respect to the hybrid vehicle in accordance with the embodiment.

When the movable gear 84 is at a position a in FIG. 1, the first gear 81 and the movable gear 84 are engaged with each other, and the rotor shaft 43 of the assist motor 40 is connected to the outer rotor shaft 35 of the clutch motor 30. As a result, the power output from the engine 50 is output to the drive shaft 22 via the clutch motor 30, and the assist motor 40 can transmit power between the drive shaft 22. This structure is schematically shown in FIG. 2. When the switch apparatus 80 switches the movable gear 84 to the position a, the structure is equivalent to the structure shown in FIG. 2. Hereinafter, this connecting state will be called an under-drive connection.

Figure 3:
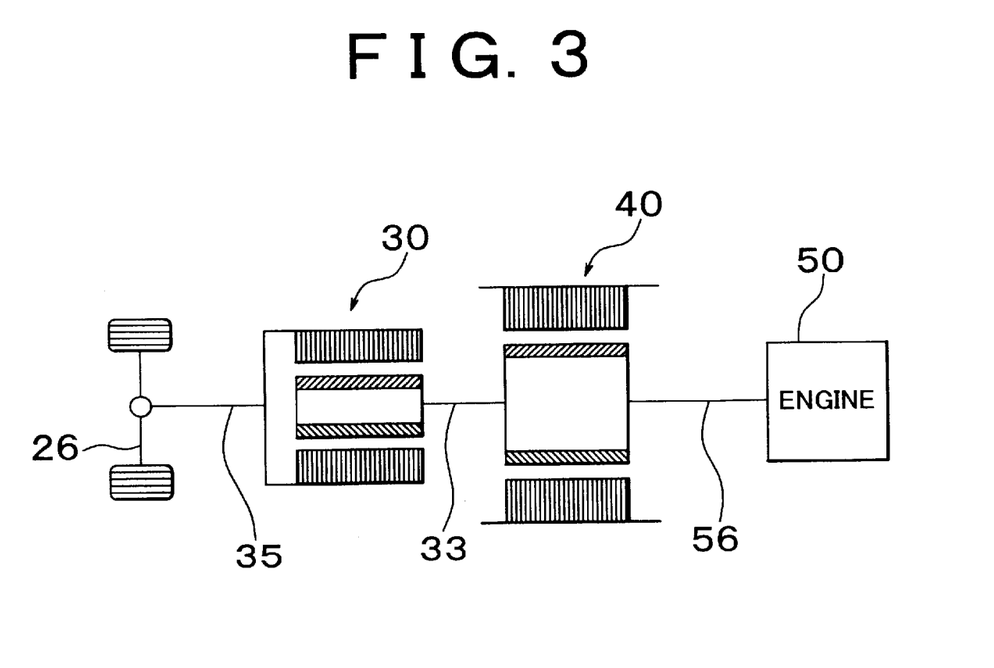
FIG. 3 is an explanatory view showing a schematic structure of a power system at a time of over-drive connection, with respect to the hybrid vehicle in accordance with the embodiment.

On the contrary, when the switch apparatus 80 switches the movable gear 84 to a position c in FIG. 1, the second gear 82 and the movable gear 84 are engaged with each other, and the rotor shaft 43 of the assist motor 40 is connected to the inner rotor shaft 33 of the clutch motor 30. As a result, with respect to the output system of the power output to the drive shaft 22 via the clutch motor 30 from the engine 50, the assist motor 40 can transmit power between the assist motor 40 and the inner rotor shaft 33. This structure is schematically shown in FIG. 3. When the switch apparatus 80 switches the movable gear 84 to the position c, the structure is equivalent to the structure shown in FIG. 3. Hereinafter, this connecting state will be called an over-drive connection.

The switch apparatus 80 can switch the movable gear 84 to a position b for engaging with the third gear 83. At this position, the movable gear 84 is in a neutral state engaged with neither of the first gear 81 and the second gear 82. The power output from the engine 50 at this time is output to the drive shaft 22 via the clutch motor 30 as it is.

Figure 4:
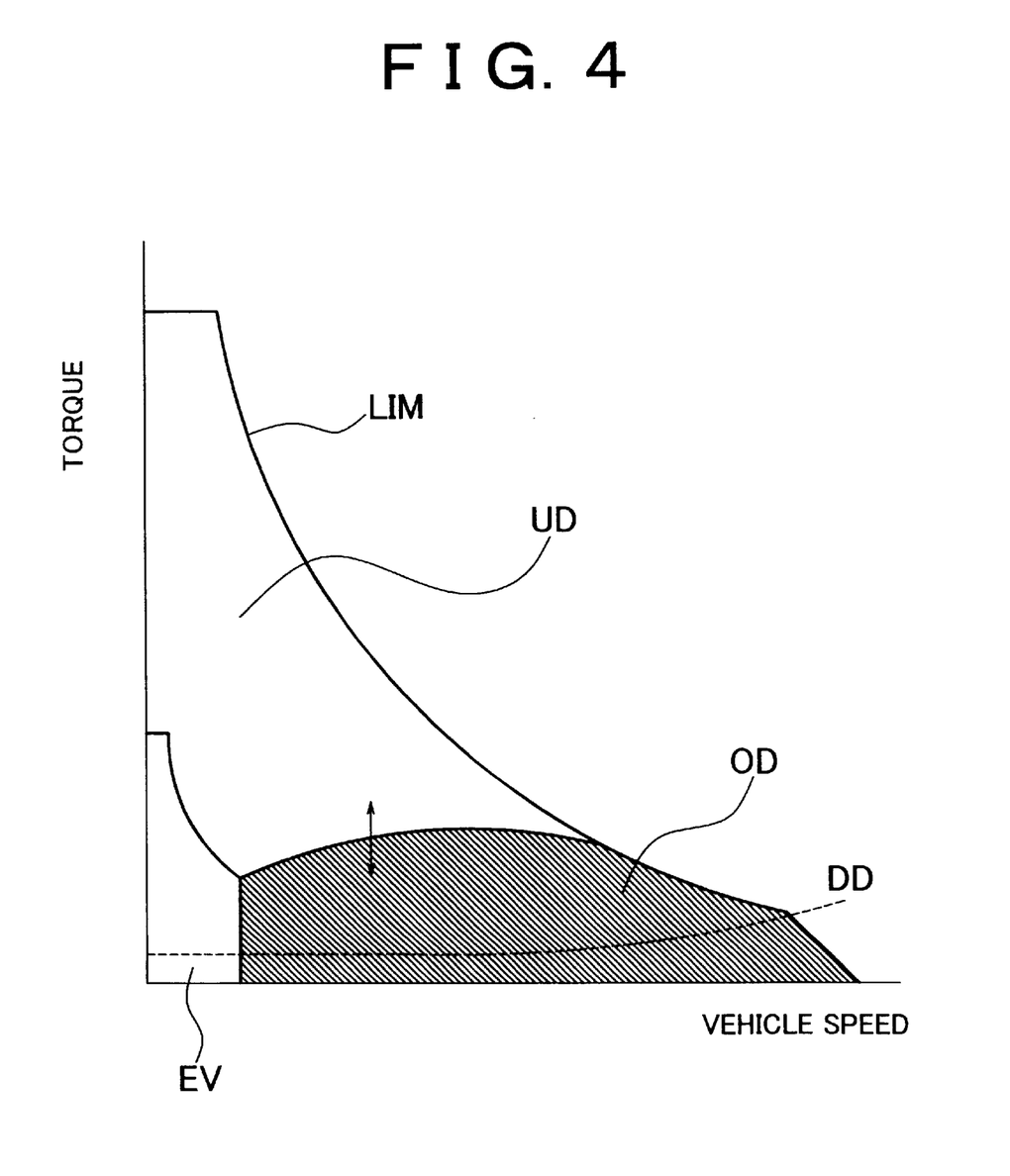
FIG. 4 is a graph showing a relation between a connecting state and a running state of the vehicle, with respect to the hybrid vehicle in accordance with the embodiment.

Each of the connection states of each of the gears can be switched by the switch apparatus 80 mentioned above, in accordance with a running state of the hybrid vehicle 10. A relation between the running state of the vehicle 10 and the connection state of the assist motor 40 is shown in FIG. 4. FIG. 4 shows a range in which the vehicle runs by taking a vehicle speed on a horizontal axis and taking a torque on a vertical axis. An area shown by a curve LIM in FIG. 4 shows a state in which the hybrid vehicle can run. An area OD shown by a hatching corresponds to a range for running in accordance with the over-drive connection. The other area UD corresponds to a range for running in accordance with the under-drive connection. Further, an area EV corresponds to a range for running in a state where the engine 50 is stopped and only the assist motor 40 is used as the power source. The hybrid vehicle 10 in accordance with the embodiment runs while switching the connection state of the assist motor 40 by the switch apparatus 80 in accordance with the running state.

In this case, the switch apparatus 80 in the present embodiment can be constituted by a plurality of clutches. That is, in place of the combination of the first to third gears 81 to 83, and the movable gear 84, the structure may be made such that a first clutch for connecting and disconnecting the outer rotor shaft 35 and the rotor shaft 43 is provided, and a second clutch for connecting and disconnecting the inner rotor shaft 33 and the rotor shaft 43 is provided. In this case, it is not necessary to provide the spline shaft 85.

The operation state of the hybrid vehicle in accordance with the present embodiment is controlled by the control unit 90. The control unit 90 is a one-chip microcomputer having CPU, ROM, RAM and the like inside in the same manner as that of the EFIECU 70, and is structure is made such that the CPU executes various kinds of control processes mentioned below in accordance with the program stored in the ROM. In order to make it possible to perform these controls, various kinds of sensors and switches are electrically connected to the control unit 90. As the sensors and switches connected to the control unit 90, there are an accelerator pedal position sensor 65a for detecting an operating amount of an accelerator pedal 65, a shift position sensor 66a for detecting a position of a shift lever 66 and the like. The control unit 90 is connected to the EFIECU 70 by a communication line, and communicates various kinds of information between the control unit 90 and the EFIECU 70. By outputting the information required for controlling the engine 50 from the control unit 90 to the EFUECU 70, it is possible to indirectly control the engine 50. It is possible to inversely input the information such as the number of revolutions of the engine 50 from the EFIECU 70. The control unit 90 functions as a controller in accordance with the invention.

A description will be briefly given of an operation of the power transmission apparatus 20. The power transmission apparatus 20 realizes a power distribution by a slip between the inner rotor 32 and the outer rotor 34 in the clutch motor 30. A part of the power of the engine 50 is directly output to the drive shaft 22 via the clutch motor 30 in a mechanical form, and a part thereof is taken out from the clutch motor 30 in a form of electric power by a slip rotation between two rotors 32 and 34. The energy taken out in the form of electricity can be stored in a battery 94 mentioned below and can be output to the assist motor 40 corresponding to another motor constituting the power transmission apparatus 20 so as to be used for increasing the torque of the drive shaft 22. That is, the power transmission apparatus 20 can freely control the power output to the drive shaft 22 by three elements including the engine 50 outputting the power or keeping a stop state, the clutch motor 30 communicating the power with the slip rotation, and the assist motor 40 capable of power running and regenerating.

Figure 5:
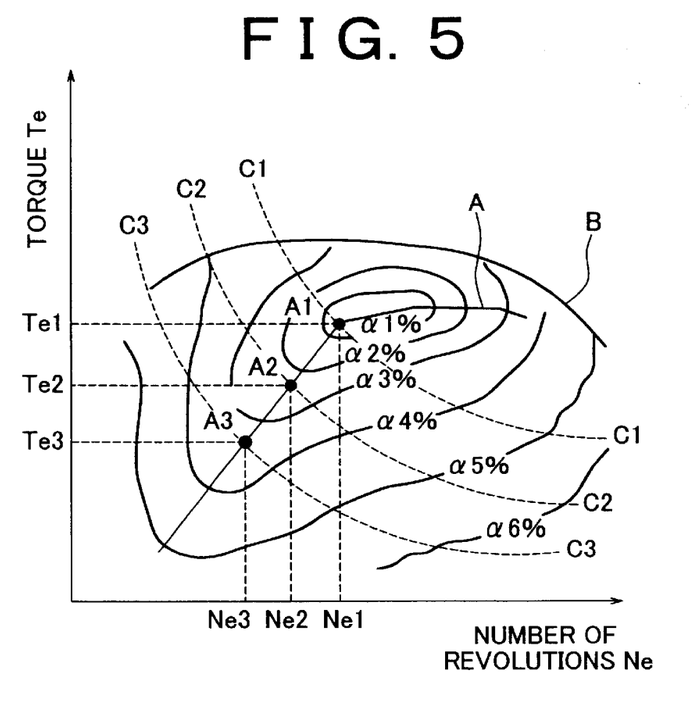
FIG. 5 is a graph showing a relation between an operation point of the engine and an operation efficiency.
Figure 6:
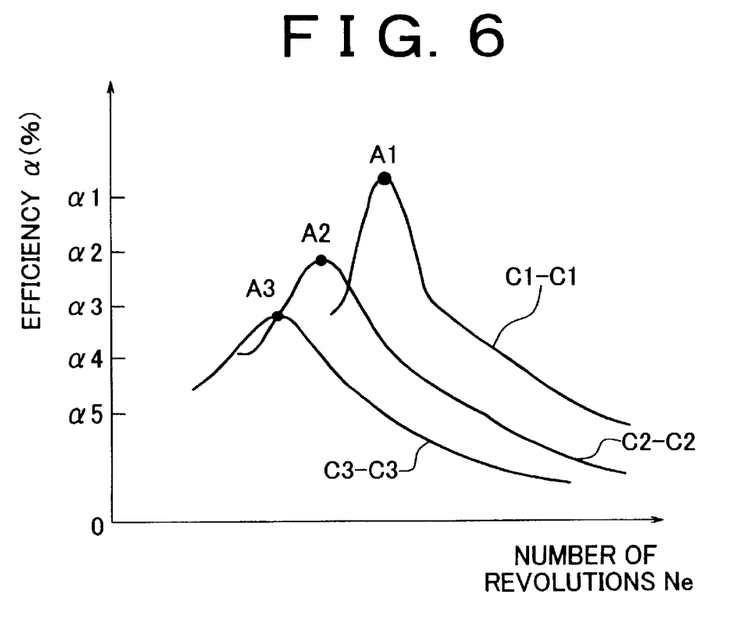
FIG. 6 is a graph showing a relation between a number of revolutions of the engine and the operation efficiency, in the case where the output power is fixed.

The control of the engine 50 in a normal operation state is performed with priority to efficiency. This state is shown in FIGS. 5 and 6. When a required power Pe from the engine 50 is output to the EFIECU 70 from the control unit 90, the EFIECU 70 sets an operation point of the engine 50 on the basis of the required power Pe. The operation point means a combination of a target number of revolutions Ne and a target torque Te of the engine 50. FIG. 5 shows an operation state of the engine 50 by taking the number of revolutions Ne of the engine on a horizontal axis and taking the torque Te on a vertical axis. A curve B in FIG. 5 shows a limit range in which the operation of the engine 50 can be performed. Curves α1 to α6 drawn by solid lines show operation points in which the operation efficiency of the engine 50 becomes fixed. The operation efficiency becomes subsequently lower in the order of α1 to α6. Further, curves C1 to C3 drawn by broken lines respectively show lines in which the power (number of revolutions×torque) output from the engine 50 becomes fixed.

The operation efficiency of the engine 50 differs greatly in accordance with the number of revolutions and the torque as shown in FIG. 5. FIG. 6 shows a relation between the number of revolutions Ne and the efficiency αof the engine 50 in the case of outputting the power corresponding to the curves C1 to C3 in FIG. 5. In the case of outputting the power corresponding to the curve C1 from the engine 50, the operation efficiency becomes the highest at a time of operating the engine 150 at the operation point (number of revolutions and torque) corresponding to a point A1 in FIGS. 5 and 6. In the same manner, in the case of outputting the power corresponding to the curves C2 and C3, the highest efficiency is obtained in the case of operating at points A2 and A3 shown in FIGS. 5 and 6. When selecting the operation point having the highest operation efficiency in each of the power to be output, the curve A in FIG. 5 can be obtained. This is called an operation curve.

The operation point in the embodiment is set by storing an experimentally determined operation curve in advance in the ROM within the control unit 90 as a map, reading the operation point corresponding to the required power Pe by referring to the map mentioned above, and setting the target number of revolutions Ne and the target torque Te in the engine 50. In accordance with the above operation, it is possible to always operate the engine 50 at the operation point having a high operation efficiency.

In this case, in order to perform these controls, the control unit 90 detects the torque of each of the shafts in addition to the number of revolutions of each of the shafts by sensors. The number of revolutions of the respective shafts are detected by resolvers provided on the respective shafts, and the torque are detected by the current detectors provided in the first drive circuit 91 and the second drive circuit 92, respectively. An illustration of these sensors is omitted in FIG. 1.

Figure 7:
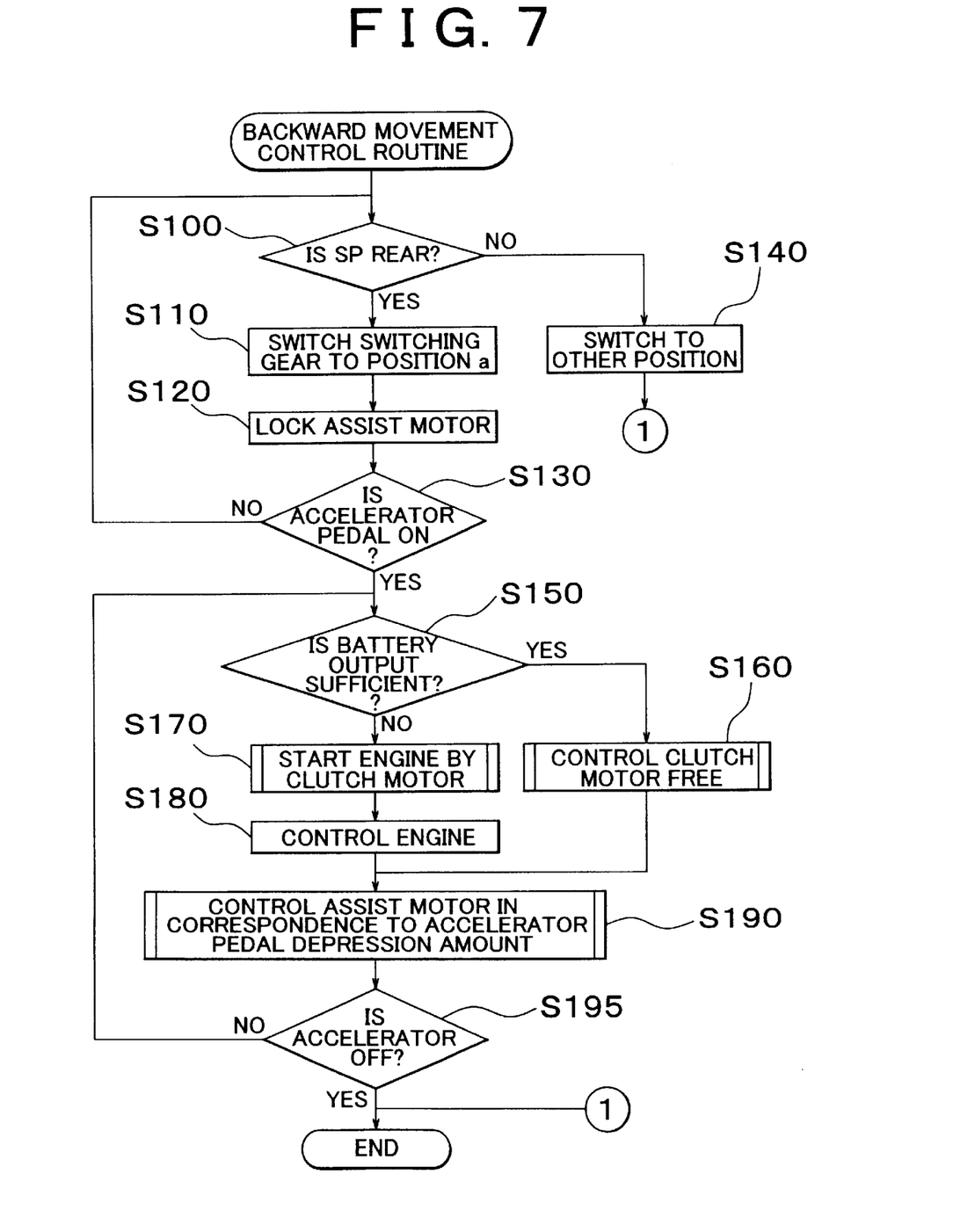
FIG. 7 is a flow chart showing a control routine at a time when the vehicle moves backward.

Next, a description will be given of a backward movement control among the operation control processes of the hybrid vehicle 10 in accordance with the present embodiment. FIG. 7 is a flow chart showing a backward movement processing routine which the control unit 90 executes in the present embodiment. When this process routine is started, it is judged whether or not a shift position SP detected by the shift position sensor 66a is a rear position (step S100). In the case that the shift lever 66 is at the rear position and the judgement mentioned above is "YES," a process of driving the actuator 86 of the switch apparatus 80 and switching the movable gear 84 of the switch apparatus 80 to the position a is executed next (step S110). As a result, the rotor shaft 43 of the assist motor 40 is connected to the outer rotor shaft 35 of the clutch motor 30, and the power transmission apparatus 20 comes into a so-called under-drive state (refer to FIG. 2).

Next, a process of locking up the clutch motor 30 is executed (step S120). There is executed a control of applying a lock-up current to the three-phase coil 46 so that the rotor 42 of the assist motor 40 does not rotate. As a result, the drive shaft 22 connected to the assist motor 40 is fixed, and the wheels 26R and 26L do not move. The axle 26 is locked by the assist motor 40 so as to prevent the vehicle from start moving immediately after putting the shift lever 66 in the rear position.

Next, it is judged whether or not the accelerator pedal has been depressed and the accelerator pedal position sensor 65a had detected this fact (step S130). Because the vehicle 10 is not moved backward unless it is detected that the accelerator pedal has been depressed. Unless the accelerator pedal is depressed, the process goes back to step S100 and the processes mentioned above (the steps S100 to S130) are repeated. In this case, if the shift lever 66 is switched to positions other than the rear position during that period (step S100), the switch apparatus 80 switches the movable gear 84 to another position required for control (step S140), and the present routine is temporarily finished.

When the shift lever 66 is in the rear position and the accelerator pedal is depressed, it is next judged whether or not the out put of the battery 94 is sufficient (step S150). This is because it is possible to move the vehicle 10 backward using only the electric power from the battery 94 and driving the assist motor 40 if the residual capacity of the battery 94 is sufficient. In this case, the clutch motor 30 is controlled to be free (step S160) and thereafter the assist motor 40 is controlled corresponding to the pedaling amount of the accelerator pedal (step S190). Accordingly, in this case, if a strong torque is required at a time of moving backward, it is possible to output the required torque to the axle 26 in an allowable range of a rating of the assist motor 40. In this case, the rotation direction of the assist motor 40 is reverse to the rotation direction at a time of moving the vehicle 10 forward.

On the contrary, in the case that it is judged that the output of the battery 94 is not sufficient (step S150), a process of starting the engine 50 by the clutch motor 30 is executed (step S170). This process is executed by driving the clutch motor 30 in a state the assist motor 40 is locked up and driving the crank shaft 56 to approximately one thousand revolutions. Until the number of revolutions of the crank shaft 56 of the engine 50 is increased to one thousand rotation, the intake and exhaust valves are set to a state in which a compression ratio is the smallest, that is, an energy loss due to the pump work is small, by the VVT 57. It is possible to easily start the engine 50 by starting the injection of fuel from the fuel injection valve 51 and igniting the mixed gas by an igniter (not shown) after the number of revolutions is increased.

Figure 8:
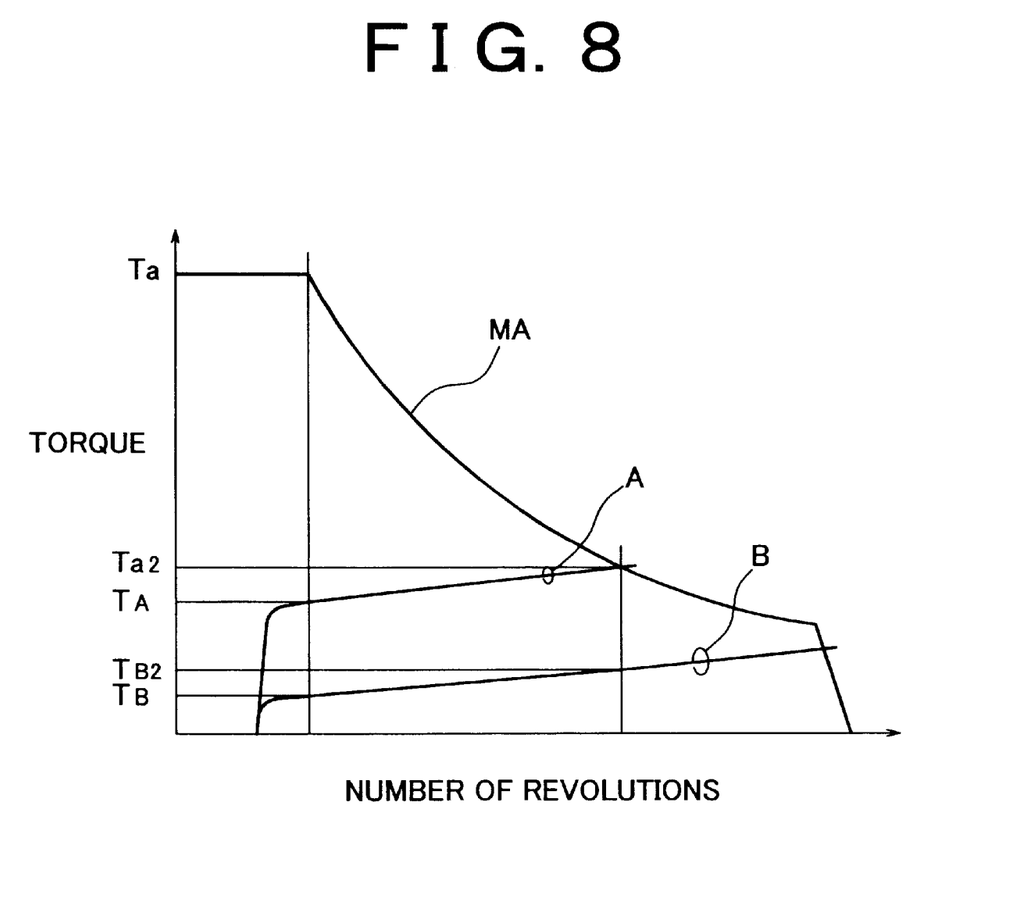
FIG. 8 is a graph showing a difference of an operation control of an engine 50.

When the engine 50 is started in the manner mentioned above, the process proceeds to a control of the engine 50 (step S180). The engine 50 is generally operated in accordance with the operation line A giving priority to the efficiency, as described in FIGS. 5 and 6. However, at a time of moving backward, the control is executed in accordance with the operation line set to a lower torque side compared to the operation line A. The operation line at a time of moving backward is shown in FIG. 8. As shown in FIG. 8, at a time of moving backward, the engine 50 is controlled in accordance with the backward movement operation line B set to a lower torque side compared to the operation line A giving priority to the efficiency. In order to operate the engine 50 in accordance with the operation line B, it is sufficient to control an amount of fuel injected from the fuel injection valve 51, an amount of intake air adjusted by the throttle valve 53 and an opening and closing timing (an advance angle value) of the intake and exhaust valves adjusted by the VVT 57. Further, the ignition timing may be controlled. Since the control of the engine 50 is actually executed by the EFIECU 70, the control unit 90 actually only instructs the EFIECU 70 the operation line with which the engine 50 should be operated.

After instructing the control of the engine 50 to the EFIECU 70, the process proceeds to a process of controlling the assist motor 40 in accordance with the depression amount of the accelerator pedal (step S190). In the case that the engine 50 is stopped, the torque which the assist motor 40 outputs is output to the drive shaft 22 as it is. However, in the case that the engine 50 is operated, since the rotation direction of the drive shaft 22 (the backward moving direction) and the rotation direction of the crank shaft 56 are opposite to each other, a torque Td output to the drive shaft 22 is obtained by subtracting an output torque Te of the engine 50 from an output torque Ta of the assist motor 40. At this time, the clutch motor 30 is in a regenerating state so as to regenerate the power output from the engine 50 in the form of electricity. The magnitude of the regenerated energy Pe is such that a maximum value obtained by the product between the engine torque Te and a number of revolutions difference ΔN between both rotors 32 and 34. Most of the energy which the engine 50 outputs is regenerated by the clutch motor 30, is stored in the battery 94 and is used for driving the assist motor 40 mentioned below. In this case, in accordance with the relation of an action and reaction, the engine torque Te applied to the inner rotor shaft 33 appears in the side of the outer rotor shaft 35 of the clutch motor 30 as it is.

In the case of operating the engine 50 at a time of moving backward in accordance with the operation line B in the low torque side, the torque of the engine 50 becomes TB when the number of revolutions of the engine 50 is N1. Accordingly, a torque Td output to the drive shaft 22 is expressed by the following formula.

$$Td = Ta - TB$$

In which Ta is an output torque of the assist motor 40, and is determined by the torque line of the motor shown by a solid line MA in FIG. 8. In this case, since the torque output to the drive shaft 22 becomes equal to the torque Ta of the assist motor 40 when the engine 50 is stopped, the torque output to the drive shaft 22 becomes small by a corresponding degree in the case that the engine 50 is operated.

After executing the processes mentioned above, it is judged whether or not the accelerator pedal is turned off (step S195), and the processes mentioned above (the steps S150 to S195) are repeated as far as the accelerator pedal is not returned. At a time when the accelerator pedal is turned off, the process goes to "END" and the present routine is completed.

In accordance with the present embodiment mentioned above, in the case of moving the vehicle 10 backward, the movable gear 84 of the switch apparatus 80 is switched to the position a and the engine 50 is stopped or started in accordance with the residual capacity of the battery 94, and in the case of starting the engine 50, the engine 50 is operated in accordance with the operation line B with lower torque than in the case of moving the vehicle 10 forward. As a result, in the case of moving the vehicle 10 backward, it is possible to obtain a stronger torque in comparison with the conventional one. In the case of operating the engine 50 in accordance with the conventional operation line A giving priority to the efficiency, the torque of the engine 50 at the number of revolutions N1 becomes TA, and the torque Td output from the drive shaft 22 is expressed by the following formula.

$$Td = Ta - TA$$

Taking a relation TA>>TB into consideration, it can be seen that the present embodiment can output a significantly large torque from the drive shaft 22 at a time of moving backward in comparison with the conventional art. As a result, in the present embodiment, it is possible to obtain a large climbing force even at a time of moving backward. The effect mentioned above is more significant as the number of revolutions of the drive shaft 22 becomes larger, as shown in FIG. 8. In the assist motor 40, the torque output from the assist motor 40 is quickly reduced when the number of revolutions becomes higher in accordance with the general output characteristic of the motor. At an operation point where the conventional operation line A giving priority to the efficiency and the characteristic line MA of the assist motor 40 intersect, with the conventional control, it is impossible to obtain the torque for moving backward from the drive shaft 22. However, in accordance with the present embodiment, it is possible to still obtain the torque expressed by the formula "Td=Ta2-TB2".

Therefore, in accordance with the present embodiment, it is possible to realize a high torque for climbing, and generate electrical power by the clutch motor 30 using the engine 50 as the power source so as to control the output of the electric power from the battery 94 at a minimum level, at a time of moving the vehicle backward. Even in the case that the output of the battery 94 can not be sufficiently obtained, it is possible to secure a high climbing force at a time of moving the vehicle backward for a sufficient long time.

Figure 9:
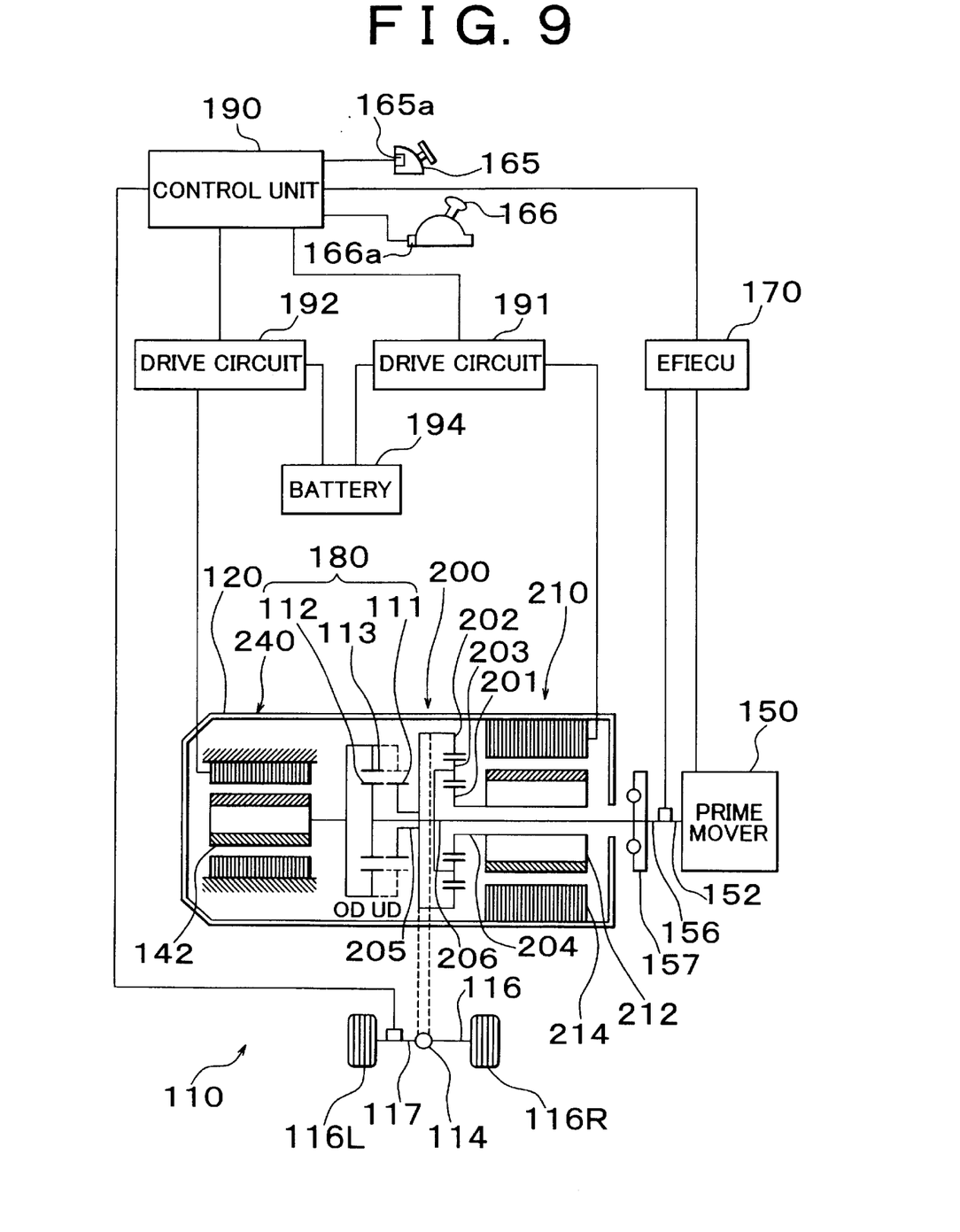
FIG. 9 is a schematic block diagram of a power transmission apparatus 120 in accordance with a second embodiment and a vehicle 110 equipped with the power transmission apparatus 120 thereon.

Next, a description will be given of a second embodiment in accordance with the invention. A hybrid vehicle 110 of a second embodiment is provided with a so-called mechanical distribution type power transmission apparatus 120, as shown in FIG. 9. The hybrid vehicle 110 employs a planetary gear 200 and an electric power generator 210 in place of the clutch motor 30 distributing the power in the first embodiment. Other structures are substantially the same as those of the hybrid vehicle (refer to FIG. 1) in the first embodiment, and there are provided a control unit 190 controlling the entire apparatus, an EFIECU 170 controlling the engine 150, first and second drive circuits 191 and 192 driving respective motors mentioned below, a battery 194 supplying and storing the electric power, an accelerator pedal position sensor 165a connected to the control unit 190 and detecting a depression amount of the accelerator pedal 165, a shift position sensor 166a detecting a position of the shift lever 166, and the like.

In this embodiment, the planetary gear 200 provided in the power transmission apparatus 120 is constituted by a sun gear 201 rotating at a center, a planetary carrier 203 provided with a planetary pinion gear revolving around an outer periphery of the sun gear 201 while rotating, and a ring gear 202 rotating in an outer periphery thereof. The sun gear 201, the planetary carrier 203 and the ring gear 202 respectively have different rotational axes. A sun gear shaft 204 which serves as a rotational axis of the sun gear 201 is hollow, and is connected to a rotor 212 of the electric power generator 210. A planetary carrier shaft 206 which serves as a rotational axis of the planetary carrier 203 is connected to a crank shaft 156 of the engine 150. A ring gear shaft 205 corresponding to a rotational axis of the ring gear 202 is connected to an axle 116 via a differential gear 114.

In the planetary gear 200, it is well known in a mechanism study that the following relation is established in the number of revolutions and the torque of the sun gear shaft 204, the planetary carrier shaft 206 and the ring gear shaft 205. That is, when the power states of two rotating shafts among three rotating shafts are determined, the power state of the remaining one rotating shaft is determined on the basis of the following relational formulas. The relational formulas are as follows. In the formulas, the formula (1) expresses a relation of the number of revolutions of the respective shafts, the formula (2) expresses a relation of the torque of the respective shafts, and the formula (3) expressed a gear ratio, respectively:

$$Ns=(1+\rho)/\rho \times Nc - Nr/\rho;$$

$$Nc=\rho/(1+\rho) \times Ns + Nr/(1+\rho);$$

$$Nr=(1+\rho)Nc-\rho Ns; \quad (1)$$

$$Tes=Tc \times \rho/(1+\rho)=\rho Ter;$$

$$Ter=Tc/(1+\rho); \quad (2)$$

$\rho$=number of teeth in the sun gear 201/number of teeth in the ring gear 202 (3)

wherein

Ns is a number of revolutions of the sun gear shaft 204;

Tes is a torque of the sun gear shaft 204;

Nc is a number of revolutions of the planetary carrier shaft 206 (accordingly, equal to the engine number of revolutions Ne);

Tc is a torque of the planetary carrier shaft 206;

Nr is a number of revolutions of the ring gear shaft 205; and

Ter is a torque of the ring gear shaft 205.

The electric power generator 210 has the same structure as that of the assist motor 240. That is, the electric power generator 210 is structured as a three-phase synchronous motor in which a coil is wound around a stator 214, and a permanent magnet is adhered to a rotor 212. The stator 214 is fixed to a case. A rotational magnetic field is generated when a three-phase alternating current is applied to the coil wound around the stator 214, and the rotor 212 rotates due to a mutual operation between the coil and a permanent adhered to the rotor 212. The electric power generator 210 has a function as a power generator regenerating the power in the form electric power when the rotor 212 is rotated by the external force. In this case, the coil wound around the stator 214 of the electric power generator 210 is electrically connected to a drive circuit 191. The control unit 190 turns on and off the transistor in the drive circuit 191 so as to control the operation of the electric power generator 210.

In the first embodiment (FIG. 1), the power distribution is performed by regenerating a part of the power input to the inner rotor 32 as the electric power by the relative slip between the inner rotor 32 and the outer rotor 34 in the clutch motor 30 while transmitting the residual power to the outer rotor 34. Further, it is possible to increase the power input from the inner rotor 32 so as to transmit to the outer rotor 34 by power running the clutch motor 30. As mentioned above, the clutch motor 30 serves as a function of the power transmission apparatus which increases and reduces the power input from one of the shafts by communication of the electric power so as to transmit it to another of the shafts.

In the hybrid vehicle in accordance with the second embodiment, it is possible to obtain the same function as that of the clutch motor 30 in the first embodiment by the combination of the planetary gear 200 and the electric power generator 210. The planetary carrier shaft 206 corresponds to the inner rotor shaft 33 of the clutch motor 30, and the ring gear shaft 205 corresponds to the outer rotor shaft 35. In this embodiment, it is possible to obtain the power adjusting apparatus function by the combination thereof.

When the power is input to the planetary carrier shaft 206 from the engine 50, the ring gear 202 and the sun gear 201 rotate in accordance with the formulas (1) to (3) mentioned above. It is possible to stop the rotation of any one of the ring gear 202 and the sun gear 201. The ring gear 202 is rotated so as to transmit a part of the power output from the engine 50 to the front axle 116 in a mechanical form. Further, the sun gear 201 is rotated so as to regenerate a part of the power output from the engine 150 by the electric power generator 210 as the electric power. On the contrary, when power running the electric power generator 210, the torque output from the electric power generator 210 can be mechanically transmitted to the axle 116 via the sun gear 201, the planetary gear 203 and the ring gear 202. Accordingly, it is possible to increase the torque output from the engine 150 so as to output to the axle 116 by power running the electric power generator 210. As mentioned above, in accordance with the second embodiment, it is possible to obtain the same function as that of the clutch motor 30 by the combination of the planetary gear 200 and the electric power generator 210.

In this embodiment, whether the assist motor 240 is connected to the output shaft (the crank shaft) of the engine 150 or to the drive shaft side is set by a switch apparatus 180 provided with a first gear 111, a second gear 112 and a third gear 113. An actuator for switching is provided in the switch apparatus 180 in the same manner as that of the first embodiment, and is connected to the control unit 190, however, an illustration thereof is omitted. Also in this embodiment, the power transmission apparatus 120 can employ various kinds of structures according to the engaging state of the gear. When engaging the first gear 111 with the third gear 113, the rotor 142 of the assist motor 240 is connected to the ring gear 205 of the planetary gear 200.

Accordingly, the power output from the engine 150 is transmitted to the drive shaft 116 via the planetary gear 200 and the assist motor 240. This is a connection state corresponding to the under-drive connection (FIG. 2) in the first embodiment.

On the contrary, when controlling the switch apparatus 180 so as to engage the second gear 112 with the third gear 113, the rotor 142 of the assist motor 240 is connected to the planetary carrier shaft 206 of the planetary gear 200. Accordingly, the power output from the engine 150 is transmitted to the drive shaft 116 via the assist motor 240 and the planetary gear 200. This is a connection state corresponding to the over-drive connection (FIG. 3) in the first embodiment.

Figure 10:
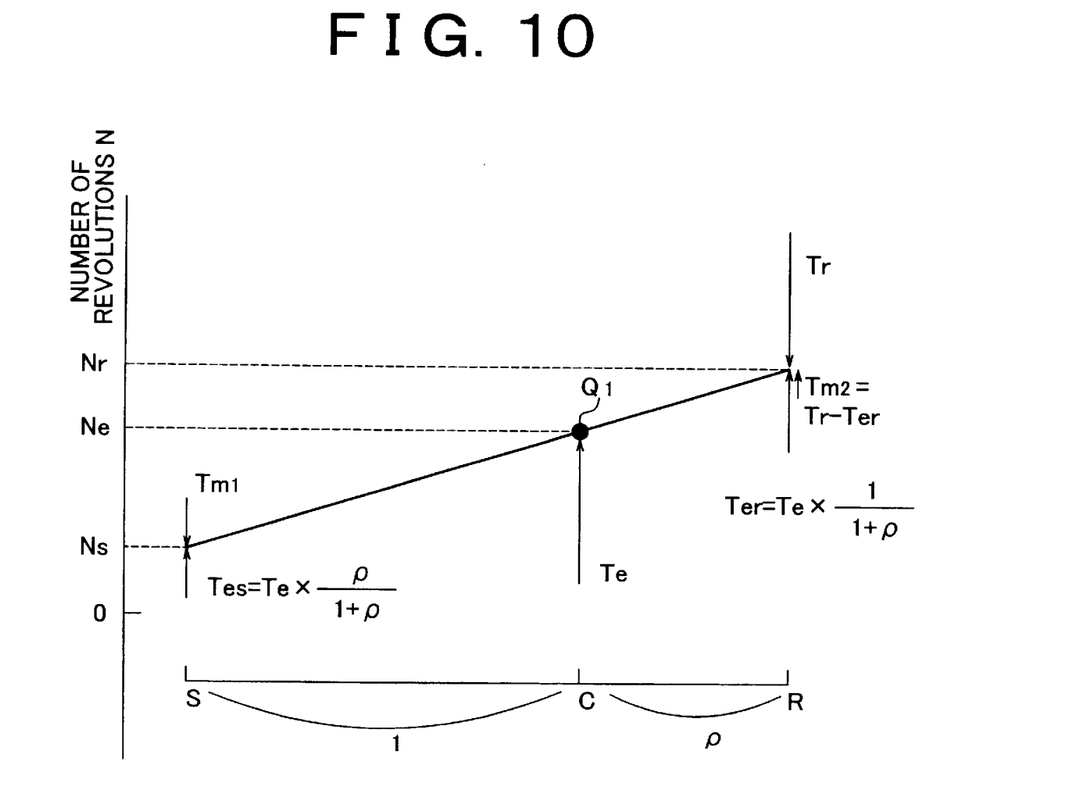
FIG. 10 is a graph showing an operation state of the power transmission apparatus 120 in accordance with the second embodiment.

FIG. 10 shows a state of the respective shafts in the planetary gear 200 at a time of switching the switch apparatus 180 so as to set it in the under-drive state. In FIG. 10, reference symbol Tm1 denotes a torque added by the electric power generator 210, reference symbol Tm2 denotes a torque added by the assist motor 240, respectively. That is, in the case where the vehicle is running at a constant speed, the torques Tm1 and Tm2 of the respective motors are applied to the number of revolutions Ne and the torque Te of the engine 150, whereby a balance of torque among three shafts is established. In FIG. 10, reference symbol Tr denotes a drive torque required for the vehicle to run at that speed.

Also in the structure mentioned above, it is possible to execute the backward moving control shown in FIG. 7 as it is, however, in the second embodiment, in the case of moving the vehicle backward, the engine 150 is operated in accordance with the operation line (a solid line B in FIG. 8) on a lower torque side than the operation line (a solid line A in FIG. 8) giving priority to the efficiency. As a result, in accordance with the formula (2) mentioned above, a torque Ter appears in the axle 116 side. However, since the torque Tm2 larger than and opposite to the torque Ter is output from the assist motor 240, the axle 116 is reversely rotated and the vehicle 110 moves backward. That is, the balance of the torque in the ring gear 202 is expressed by the formula Tr=Tm2−Ter, whereby a difference between the torque Tm2 output from the assist motor 240 and the torque Ter distributed from the engine 150 can be obtained as the torque for moving the vehicle 110 backward. Since the engine 150 is operated at an operation point with lower torque, it is possible to output a large torque to the axle 116.

Figure 11:
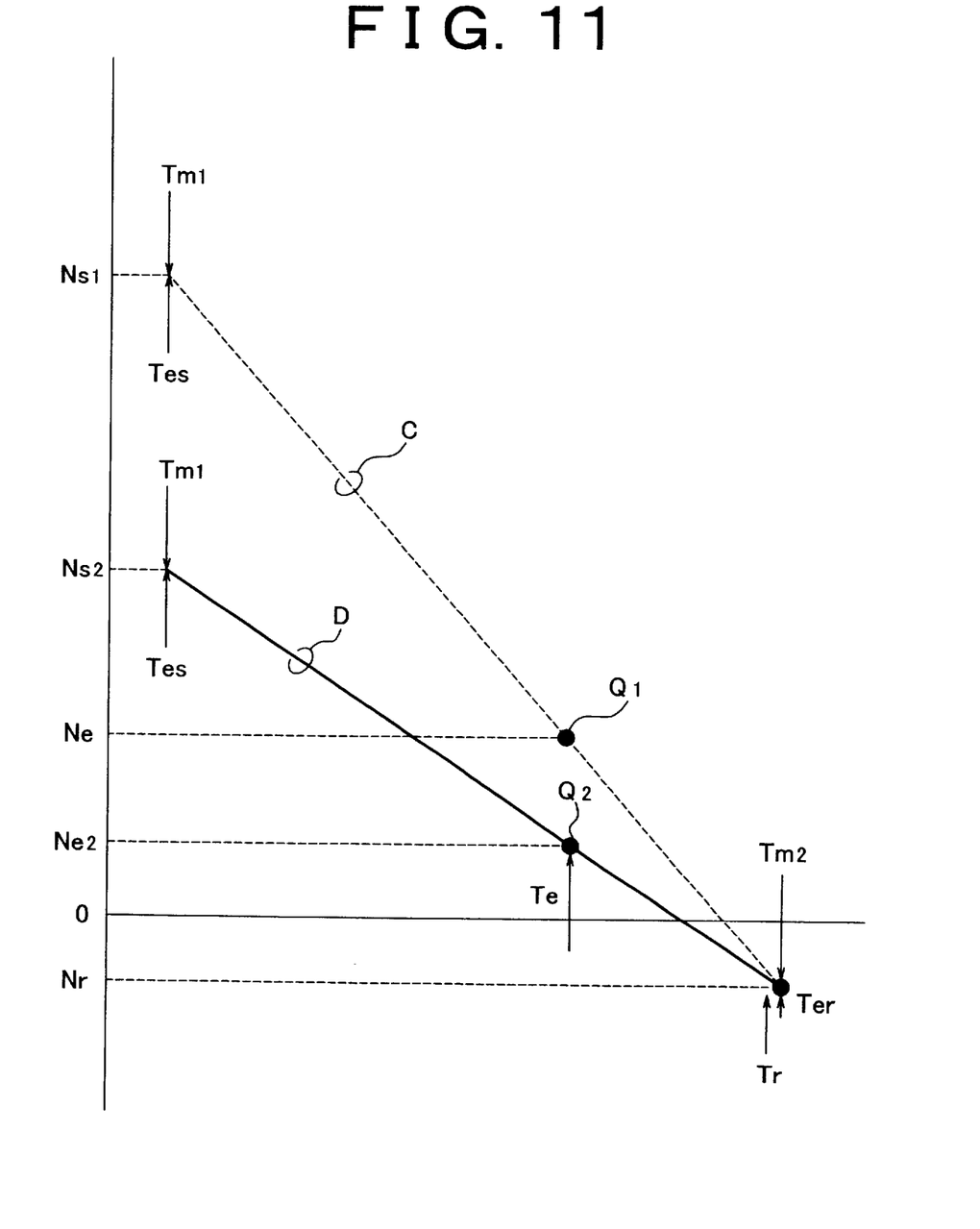
FIG. 11 is a graph showing an operation state at a time of moving backward.

Further, in this embodiment, the structure is made such that in the control of the engine (step S180 in FIG. 7), the engine 150 is operated in the low rotational area. This relation is shown in FIG. 11. That is, when operating the engine 150 at the operation point Q1 with the number of revolutions Ne and the torque Te shown in FIG. 10, the number of revolutions Ns1 of the sun gear 201 becomes significantly high. Since the control is executed so as to balance the number of revolutions and the torque of the electric power generator 210 with respect to the number of revolutions Ns1 and the torque Tes of the sun gear 201, the operation point of the electric power generator 210 results in the high rotation side. These relations can be immediately understood from the operation graph of the planetary gear 200 shown by a broken line C in FIG. 11. On the contrary, when changing the operation point of the engine 150 to the low number of revolutions side and operating at the operation point Q2 with the number of revolutions Ne2 and the torque Te, the number of revolutions Ns2 of the sun gear 201 is significantly lowered in the case that the number of revolutions Nr and the torque Tr output to the axle 116 for backward moving are the same. As a result, it is possible to make the number of revolutions of the electric power generator 210 balancing therewith low. This relation can be understood from the operation graph of the planetary gear 200 shown by a solid line D in FIG. 11. When reducing the number of revolutions of the engine 150 by $\Delta N$, the number of revolutions of the sun gear 201 can be reduced by $\Delta N(1+\rho)/\rho$ in accordance with the formula (1).

In the mechanical distribution type power transmission apparatus 120, the torque Te of the engine 150 appears in the axle 116 side only by an mount of $1/(1+\rho)$ due to the operation of the planetary gear 200. Accordingly, even when the torque Tm2 output from the assist motor 240 is the same, it is possible to increase the torque at a time of moving backward by the electrical distribution type power transmission apparatus 120 in which the engine torque Te appears as it is. However, since a limitation by the number of revolutions exists in the planetary gear 200, it is possible to set the number of revolutions of the axle 116 (accordingly, the vehicle speed) at a time of moving backward to a high range by reducing the number of revolutions of the engine 150, if the torque is the same.

The description has been given of the embodiments in accordance with the invention, however, the invention is not limited to the embodiments mentioned above and can be modified in various aspects within a scope of the invention. For example, in each of the embodiments mentioned above, a gasoline engine operated by a gasoline is employed for the engine 50, and it is also possible to employ various kinds of internal combustion engine or external combustion engine such as a turbine engine, a jet engine, a rotary engine or the like in addition to a reciprocating engine such as a diesel engine or the like.

Further, as the clutch motor 30 and the assist motor 40, the PM type (permanent magnet type) synchronous electric motor is employed, however, it is also possible to employ a VR type (variable reluctant type) synchronous electric motor, a vernier motor, a direct current electric motor, an induction electric motor, a super conductive electric motor, or the like as far as a regenerating operation and a power running operation can be executed. Further, in order to execute only a power running operation, it is possible to employ a direct current motor, a step motor or the like.

It is possible to reverse the relation between the inner rotor, the outer rotor and the external rotational shaft in the clutch motor 30. Further, in place of the outer rotor and the inner rotor, disc-like rotors opposing each other may be employed.

As the first and second drive circuits 91 and 92 or 191 and 192, the transistor inverter is employed, however, it is also possible to employ an insulated gate bipolar mode transistor inverter, a thyristor inverter, a voltage pulse width modulation inverter, a rectangular wave inverter (a voltage type inverter and a current type inverter), a resonance inverter, or the like.

As the battery 94 corresponding to a secondary battery, it is possible to employ a Pb battery, a NiMH battery, a Li battery, or the like, however, it is possible to employ a capacitor in place of the battery 94. Further, in accordance with the present embodiment, the CPU executes a software, whereby various kinds of control processes are realized, however, the control processes mentioned above can be realized by a hardware.

In each of the embodiments mentioned above, the description is given of the case where the power transmission apparatus is mounted on the vehicle, however, the invention is not limited to this, and it is possible to mount the power transmission apparatus on traveling means such as a ship, an airplane or the like and other various kinds of industrial machinery as far as two output shafts are provided.

What is claimed is:

1. A power transmission apparatus which can output at least a part of power output by a prime mover to a drive shaft in a mechanical form, comprising:
   a prime mover adjuster for adjusting a state of the power output from said prime mover;
   a power generator connected to said prime mover in such a manner as to be capable of electrically generating at least a part of the power output from said prime mover;
   an electric motor connected between an output shaft of said prime mover and said drive shaft and capable of forwardly rotating so as to rotate said drive shaft in the same direction as a rotation direction of said output shaft and reversely rotating so as to rotate said drive shaft in a reverse direction to the rotation direction of said output shaft; and
   a controller rotatively driving said electric motor in the reverse direction to that of the output shaft of said prime mover using an energy regenerated by said power generator and controlling said prime mover adjuster so as to control a state where at least a part of the power is output from the prime mover to the drive shaft and a state of the power output from said prime mover to an amount lower than that in the case of forwardly rotating said drive shaft, at a time of reversely rotating said drive shaft.

2. A power transmission apparatus according to claim 1, wherein said prime mover is an internal combustion engine that mixes fuel with air sucked via an intake valve so as to perform an explosive combustion, and
   said prime mover adjuster controls an amount of said intake air and an opening and closing timing of said intake valve.

3. A power transmission apparatus according to claim 1, further comprising:
   a battery storing an electric power regenerated by said power generator,
   wherein said controller drives said electric motor using at least a part of the electric power stored in said battery in addition to said regenerated electric power, at a time of reversely rotating said drive shaft.

4. A power transmission apparatus according to claim 1, wherein there is employed a three-shaft type power transmission mechanism in which three shafts are provided and the power input to and output from one shaft is determined by the power input to and output from other two shafts, one of three shafts in said mechanism is connected to the output shaft of said prime mover, another one shaft is connected to said drive shaft, and the remaining one shaft is connected to said power generator, and
   wherein said electric motor is connected to said drive shaft.

5. A power transmission apparatus according to claim 1, wherein the prime mover is operated with lower torque at a time of reversely rotating said drive shaft.

6. A power transmission apparatus according to claim 1, wherein said power generator is a pair-rotor electric motor equipped with two relatively rotatable rotors, one of said pair of rotors is connected to the output shaft of said prime mover and the other is connected to said drive shaft.

7. A power transmission apparatus according to claim 6, further comprising a switch device capable of selectively connecting said electric motor to one of said output shaft of said prime mover and said drive shaft,
   wherein said controller switches said switch device at a time of reversely rotating said drive shaft, thereby connecting said electric motor to said drive shaft.

8. A power outputting method which outputs at least a part of power output by a prime mover to a drive shaft in a mechanical form, wherein the method comprises the steps of:
   adjusting a state of the power output from said prime mover;
   electrically regenerating at least a part of the power output from said prime mover by a power generator connected to an output shaft of said prime mover,
   forwardly rotating said drive shaft in the same direction as a rotation direction of said output shaft or reversely rotating said drive shaft in a reverse direction to the rotation direction of said output shaft by an electric motor connected between the output shaft of said prime mover and said drive shaft; and
   at a time of rotating said drive shaft in a reverse direction, rotating said electric motor in the reverse direction to that of the output shaft of said prime mover using an energy regenerated by said power generator and controlling a state where at least a part of the power is output from the prime mover to the drive shaft and a state of the power output from said prime mover to an amount lower than that in the case of forwardly rotating said drive shaft.

9. A hybrid vehicle comprising:
   a prime mover which can output at least a part of power to a drive shaft in a mechanical form;
   a power adjusting apparatus which can transmit the power between the drive shaft; and
   a prime mover adjuster for adjusting a state of the power output from said prime mover,
   wherein said power adjusting apparatus comprises:
       a power generator capable of electrically regenerating at least a part of the power output from said prime mover;
       an electric motor connected between an output shaft of said prime mover and said drive shaft and capable of forwardly rotating so as to rotate said drive shaft in the same direction as a rotation direction of said output shaft and reversely rotating so as to rotate said drive shaft in a reverse direction to the rotation direction of said output shaft; and
       a controller rotatively driving said electric motor in the reverse direction to that of the output shaft of said prime mover by using an energy regenerated by said power generator and controlling said primer mover adjuster so as to control a state where at least a part of the power is output from the prime mover to the drive shaft and a state of the power output from said prime mover to an amount lower than that in the case of forwardly rotating said drive shaft, at a time when the vehicle moves backward.

10. A power transmission apparatus which can output at least a part of power output by a prime mover to a drive shaft in a mechanical form, comprising:
    a prime mover adjuster for adjusting a state of the power output from said prime mover;
    a power generator connected to said prime mover in such a manner as to be capable of electrically regenerating at least a part of the power output from said prime mover;
    an electric motor connected between an output shaft of said prime mover and said drive shaft and capable of forwardly rotating so as to rotate said drive shaft in the same direction as a rotation direction of said output shaft and reversely rotating so as to rotate said drive shaft in a reverse direction to the rotation direction of said output shaft; and a controller rotatively driving said electric motor in the reverse direction to that of the output shaft of said prime mover using an energy regenerated by said power generator and controlling said prime mover adjuster so as to control a state of the power output from said prime mover to an amount lower than that in the case of forwardly rotating said drive shaft, at a time of reversely rotating said drive shaft, wherein there is employed a three-shaft type power transmission mechanism in which three shafts are provided and the power input to and output from one shaft is determined by the power input to and output from other two shafts, one of three shafts in said mechanism is connected to the output shaft of said prime mover, another one shaft is connected to said drive shaft, and the remaining one shaft is connected to said power generator and said electric motor is connected to said drive shaft.

11. A power transmission apparatus according to claim 10, wherein the prime mover is operated in a low rotational area at a time of reversely rotating said drive shaft.

12. A power transmission apparatus according to claim 10, wherein the prime mover is operated with lower torque and in a low rotational area at a time of reversely rotating said drive shaft.

13. A power transmission apparatus according to claim 10, wherein a sun gear shaft is connected to a rotor of the power generator, a planetary carrier shaft is connected to a crank shaft of the primary mover and a ring gear is connected to the drive shaft.

14. A power transmission apparatus according to claim 10, further comprising:

a battery storing an electric power regenerated by said power generator, wherein said controller drives said electric motor using at least a part of the electric power stored in said battery in addition to said regenerated electric power, at a time of reversely rotating said drive shaft.

15. A power transmission apparatus according to claim 10, wherein the prime mover is operated with lower torque at a time of reversely rotating said drive shaft.

16. A power transmission apparatus according to claim 15, wherein the prime mover is operated to lower torque rather than to be operated at a predetermined condition which gives priority to an operation efficiency of the prime mover at a time of reversely rotating said drive shaft.

17. A power transmission outputting method with outputs at least a part of power output by a prime mover to a drive shaft in a mechanical form, wherein the method comprises the steps of:

adjusting a state of the power output from said prime mover;

electrically regenerating at least a part of the power output from said prime mover by a power generator connected to an output shaft of said prime mover;

forwardly rotating said drive shaft in the same direction as a rotation direction of said output shaft or reversely rotating said drive shaft in a reverse direction to the rotation direction of said output shaft by an electric motor connected between an output shaft of said prime mover and said drive shaft; and at a time or rotating said drive shaft in a reverse direction, rotating said electric motor in the reverse direction to that of the output shaft of said prime mover using an energy regenerated by said power generator and controlling said prime mover adjuster so as to control a state of the power output from said prime mover to an amount lower than that in the case of forwardly rotating said drive shaft, wherein there is employed a three-shaft type power transmission mechanism in which three shafts are provided and the power input to and output from one shaft is determined by the power input to and output from other two shafts, one of three shafts in said mechanism is connected to the output shaft of said prime mover, another one shaft is connected to said drive shaft, and the remaining one shaft is connected to said power generator and said electric motor is connected to said drive shaft.

18. A power transmission outputting method according to claim 17, wherein the prime mover is operated with lower torque at a time of reversely rotating said drive shaft.

19. A power transmission apparatus which can output at least a part of power output by a prime mover to a drive shaft in a mechanical form, comprising:

a prime mover adjuster for adjusting a state of the power output from said prime mover;

a power generator connected to said prime mover in such a manner as to be capable of electrically regenerating at least a part of the power output from said prime mover;

an electric motor connected between an output shaft of said prime mover and said drive shaft and capable of forwardly rotating so as to rotate said drive shaft in the same direction as a rotation direction of said output shaft and reversely rotating so as to rotate said drive shaft in a reverse direction to the rotation direction of said output shaft; and a controller rotatively driving said electric motor in the reverse direction to that of the output shaft of said prime mover using an energy regenerated by said power generator and controlling said prime mover adjuster to operate at a predetermined condition which reduces an operation efficiency of the prime mover and to control a state where at least a part of the power is output from the prime mover to the drive shaft at a time of reversely rotating said drive shaft.

20. A power transmission apparatus according to claim 19, wherein there is employed a three-shaft type power transmission mechanism in which three shafts are provided and the power input to and output from one shaft is determined by the power input to and output from other two shafts, one of three shafts in said mechanism is connected to the output shaft of said prime mover, another one shaft is connected to said drive shaft, and the remaining one shaft is connected to said power generator and said electric motor is connected to said drive shaft.

* * * * *